March 26, 1963  S. S. KWOLEK  3,083,062
TIRE TRIM
Filed Aug. 11, 1961
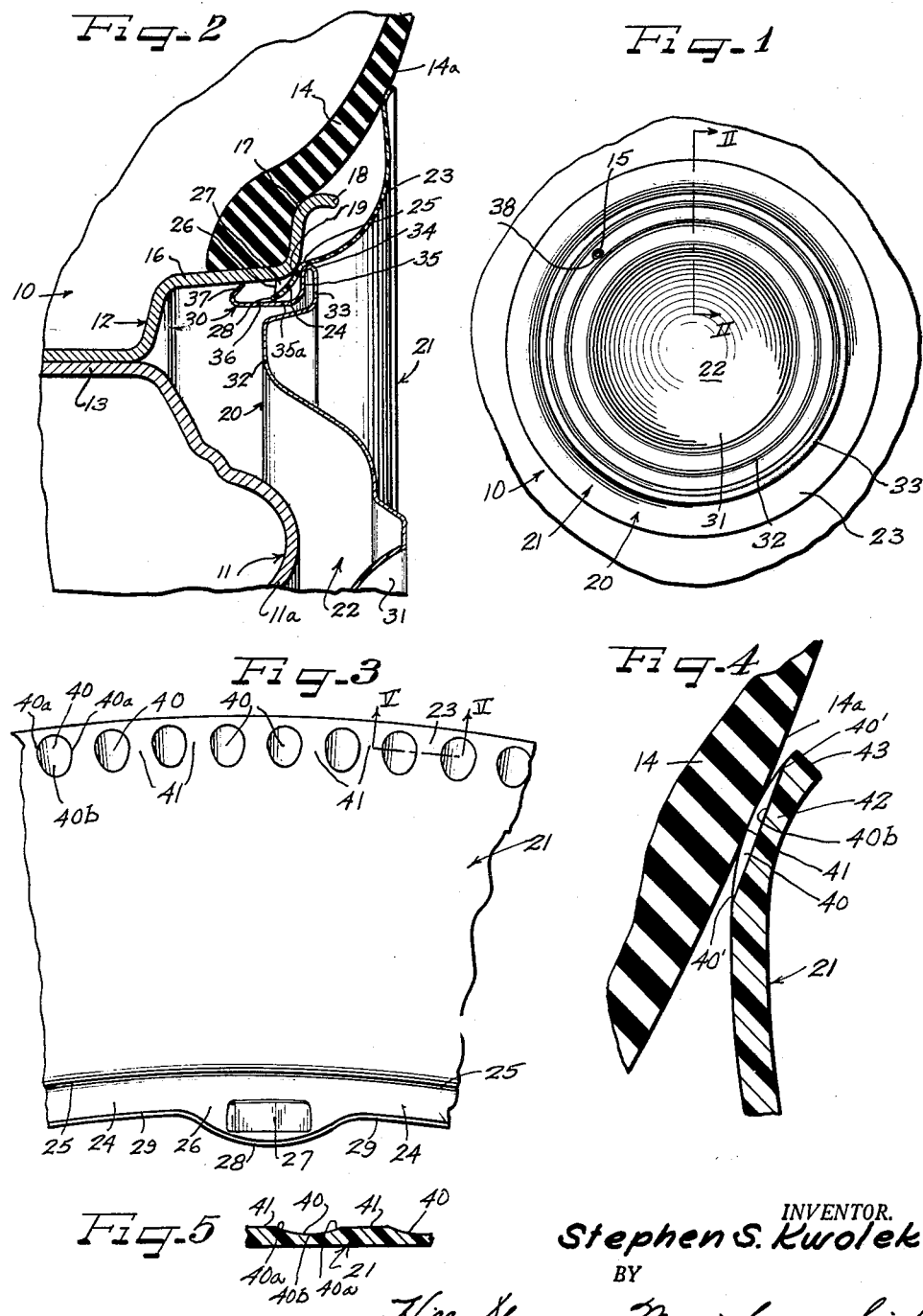
INVENTOR.
Stephen S. Kwolek
BY
ATTORNEYS

United States Patent Office 3,083,062
Patented Mar. 26, 1963

3,083,062
TIRE TRIM
Stephen S. Kwolek, Detroit, Mich., assignor to Lyon Incorporated, Detroit, Mich., a corporation of Delaware
Filed Aug. 11, 1961, Ser. No. 130,848
4 Claims. (Cl. 301—37)

The present invention relates generally to a wheel structure and more particularly to a cover structure for retained disposition upon the outer side of the vehicle wheel.

In the automobile industry at the present time, there has been a great demand for cover structures which are highly distinctive and unique in construction and design. One area of interest has been in a multi-part cover structure including a metallic cover member and a synthetic ring member, the ring member being colored differently than the cover member to provide a contrasting color appearance. As an example, the cover member may be made from stainless steel and the trim member may be made from a synthetic material such as polyethylene and which trim member may be substantially black in color with a violet or gold strip along its outer margin.

When a synthetic ring member or trim ring of the type disclosed above has been mounted on a vehicle wheel and rotated during the operation of the vehicle on the road, it has been found that a screeching noise is generated apparently due to the rubbing action that occurs as a result of the flexure and rubbing of the tire side wall of the pneumatic tire against the outer ring margin.

According to the present invention, it has been found that by grooving the outer trim ring margin at circumferentially spaced intervals along its area of engagement with the tire side wall, that the screeching sound ordinarily generated through the operation of a trim ring of this type upon a vehicle wheel is thereby eliminated. Apparently, by providing circumferentially spaced grooves about the circumference of the outer ring margin at its area of engagement with the tire rim, the rubbing action which occurs between an outer trim ring margin and a tire side wall is altered to such an extent to produce a different harmonic result whereby the screeching sound is eliminated.

An important object of this invention is to provide a new and improved trim ring which is adapted to be mounted on a vehicle wheel and function without producing any screeching sound during the operation of the vehicle.

Still another important object of this invention is to provide a new and improved vehicle wheel structure having a tire side wall simulating ring member mounted thereon which is capable of operating in a screech-less manner when rotated with the wheel.

According to general features of this invention there is provided a trim ring having a sound damper enabling the trim ring to be mounted on a vehicle wheel and rotated with a vehicle wheel whereby the screeching noise ordinarily generated is eliminated.

According to still further objects of this invention there is provided a trim ring having grooved areas spaced circumferentially about the outer margin of a tire trim at its axially inner side along the area which is adapted to engage against a tire side wall.

Still another object of this invention is to provide a tire trim which may be economically manufactured on a large production basis and which may be readily secured to a vehicle wheel.

Still another object of this invention is to provide a tire trim of the type described above having means for securing it upon a vehicle wheel.

Other objects and features of the present invention will more fully become apparent in view of the following detailed description taken in conjunction with the accompanying drawings and in which:

FIGURE 1 is a front elevation of a wheel structure;

FIGURE 2 is an enlarged fragmentary radial sectional view taken substantially on the line II—II looking in the direction indicated by the arrows, as shown in FIGURE 1;

FIGURE 3 is an enlarged fragmentary rear elevation of a trim ring member of the type shown in FIGURE 2;

FIGURE 4 is an enlarged fragmentary radial section showing the manner in which the outer margin of the trim ring is engaged with a tire side wall; and FIGURE 5 is an enlarged fragmentary cross sectional view taken substantially on the line V—V looking in the direction indicated by the arrows as shown in FIGURE 3.

As shown on the drawings:

The reference numeral 10 in FIGURE 1 indicates generally a wheel structure. In FIGURE 2, the wheel structure is shown as including a body part 11 and a multi-flanged drop center type of tire rim 12 which is secured with the body part at 13. In order to mount the body part and the rim on a vehicle wheel, the body part is provided with a bolt-on flange 11a. Suitable threaded lugs may be telescoped through holes in the bolt-on flange 11a and secured to a vehicle wheel axle (not shown) to clamp the body part to the wheel axle.

The wheel structure 10 further includes a pneumatic tire 14 which may be either of the tube or tubeless type and which has a valve 15 for inflating the same. The tire 14 is illustrated as being mounted on the tire rim.

The tire rim further includes a series of step-type flanges including an intermediate rim flange 16, a radial rim flange 17, and a terminal rim flange 18. Disposed at the juncture of the intermediate axial rim flange 16 and the radial rim flange 17 is an annular rim shoulder 19.

The drawings illustrate a cover structure 20 as being mounted on the wheel. The cover structure includes a synthetic trim member 21 which may be comprised of any suitable material such as nylon and the like. The cover structure 20 further includes a cover member 22 which may be also comprised of any suitable material such as stainless steel and the like.

The trim member has an annular accurate trim portion 23 as well as a radially inwardly offset inner trim margin 24 at its inner end. A seat 25 is disposed inwardly of the juncture between the annular arcuate trim portion 23 and the inwardly offset inner trim margin 24. When the trim member 21 is mounted on a vehicle wheel, it will be noted the inner trim margin 24 is seated on the annular rim shoulder 19.

The inner trim margin 24 is provided with circumferentially spaced offset trim extensions 26 and each of the extensions has anti-pull-out means comprising an integral trim bump 27. It will be seen from the drawings that the inner trim margin as well as the trim extensions 26 are arcuate and have inner and outer surfaces which are smoothly blended in common arcs. In essence, the trim member then comprises a ring having two arcuate portions including the annular arcuate trim portion 23 as one arcuate portion and the inner trim margin 24 and the trim extensions 26 as the other arcuate portion.

Each of the trim extensions 26 has a rounded radially inner extension edge 28 with opposite ends of the extension edge 28 being merged and joined with an innermost marginal edge 29 of the inner trim margin 24.

When the trim member 21 is mounted on the wheel, its inner marginal trim edge 29 is so disposed with respect to the trim member 21 and the annular rim shoulder 19 so as to axially confront the annular trim shoulder. By this construction, the circumferentially spaced trim extensions 26 are then free to extend radially and axially inwardly of the rim shoulder 19 permitting the trim bumps 27 to engage the axial rim flange 16. This relationship is important so as to permit cover retaining extensions 30 on the cover member 22 to extend axially across the inner marginal trim edge 29 and circumferentially between the trim bumps 27 into retained engagement with the axial rim flange 16.

The cover member 22 is of a dished type and includes a central crown 31 as well as a dished cover portion 32 and an outer cover margin 33. The outer cover margin is provided with an annular seating cover portion 34 at the juncture between the cover margin 33 and a radially extending annular cover flange 35. This annular seating cover portion 34 is adapted to be engaged in the trim seat 25 when the trim member and the cover member are mounted in assembly on the vehicle wheel.

It will be noted the cover retaining extensions 30 are of the return bent type and project axially inwardly of an annular axially extending marginal cover flange 35a and are joined at axially outer ends with the cover flange 35a, the flange 35a being disposed at the radially inner end of the flange 35. Each of the extensions 30 includes an axial resiliently deflectable cover extension leg 36 as well as a return bent short stiff terminal cover extension leg 37. The leg 37 has a terminal cover extension edge adapted for edgewise engagement with the intermediate rim flange 16. Since the extensions 30 are arranged in a common circle or orbit having a diameter slightly in excess of the diameter of the intermediate rim flange 16, the cover may be engaged under resilient tension when mounted on the wheel since the extensions 30 are deflected radially inwardly slightly out of normal position. When the cover structure is mounted on the wheel, it will be noted the trim extensions 26 are supported on the resilient axial legs 36 and that these resilient axial legs exert a spring force against the trim extensions 26 to hold the trim bumps 27 bottomed against the rim flange 16.

The cover structure may be mounted on the wheel by initially centering and bottoming the trim member 21 against the annular rim shoulder 19. The cover valve stem opening 38 is then aligned with the valve stem 15 and the cover retaining extensions 30 are axially aligned with the trim extensions 26 whereupon an axial force is applied against the cover member 22 to cause the cover member to be moved axially inwardly into cover retaining engagement with the wheel. The retaining action between the cover member and the axial rim flange 16 serves to also maintain the trim member 21 in assembly on the wheel. When the cover member and the trim member are in assembly on the wheel, the outer cover margin 33 is engaged in the trim seat 25 and the extensions 30 coact with the axial rim flange 16 while at the same time securing the trim bumps 27 against rim flange 16 to prevent the trim member from being disassembled from the wheel and to prevent radially outward movement of the trim member relative to the annular rim shoulder 19.

An alternative way to assemble the trim member 21 and the cover member 22 on the wheel is to assemble the trim member 21 and the cover member 22 together before applying them to the wheel. This result may be obtained by biasing the trim extensions 26 over the return bent terminal 37 so that the trim extensions are secured in the cover pocket defined by the cover flanges 35 and 35a and the extension legs 36 and 37. The trim member 21 may be pulled apart from the cover member 22 merely by moving the extension over the return bent terminal 27.

The cover structure 20 may be removed from the wheel by inserting a suitable pry-off tool underneath the outer cover margin so as to release the cover retaining extensions 30 whereupon the trim member 21 and the cover member 22 may be removed from the wheel.

According to the present invention, the trim ring 21 is provided with grooved areas 40 which are circumferentially spaced at the axially inner side of the outer trim ring margin 23 at the area where the outer trim ring margin is adapted to engage against a tire side wall 14a. The grooved areas 40 are separated from one another by circumferentially spaced tire side wall engaging areas indicated generally at 41. In this regard it should be noted that the outer ring margin is generally of an arched or arcuate cross sectional configuration at its area of engagement with the tire side wall 14a providing an arcuate trim ring marginal portion 42. The arcuate trim ring marginal portion 42 is turned radially and axially away from the tire side wall 14a so that outer marginal trim ring edge 43 is free of the tire side wall to prevent grooving. It will further be noted that the grooved areas 40 extend across the arcuate trim ring portion 42 so that radially opposite ends of the grooved areas as indicated at 40' are disposed in spaced relation to the tire side wall 14a ventilating the ring underside.

According to road tests which have been made on a trim ring sized for mounting on a 14-inch wheel, which trim ring is manufactured from a marlex-type material, it has been found that the screeching may be eliminated where the grooved areas 40 are spaced approximately $\frac{1}{16}$ of an inch apart about the circumference of the ring margin 23. Each of the grooved areas has a circumferential width, as measured between side edges 40a, 40a of the groove, which approximates $\frac{3}{16}$ inch. The radial length of the groove 40 measured along a bottom 40b of the groove approximates $\frac{1}{4}$ inch. The depth of the groove 40 on the tested cover is approximately $\frac{1}{64}$ inch to $\frac{1}{32}$ inch. The thickness of the outer ring margin 23 on the tested cover was approximately $\frac{1}{16}$ inch.

In the prior types of trim rings, the screeching sound apparently resulted from the rubbing action of the outer trim ring edge against the tire side wall. By grooving the trim ring at the area where it is to be engaged with the tire side wall, the resultant harmonic produced by the rubbing of the trim ring against the tire side wall is so varied as to eliminate the screeching noise.

It has been found that the continuity of contact between the underside of the tire trim and the outer side wall surface, particularly where the trim ring and the tire are damp or wet, sets up a vibrational frequency causing a screeching noise when the wheel is rotated in the operation of a vehicle such as an automobile. It has further been found that by reducing the direct contact between the tire trim and the tire side wall surface from a theoretical 100% to approximately 30% or less and the breaking up of the continuity of the engagement between the tire trim and the side wall of the tire by the use of notches has reduced the frictional vibration, eliminating the noise formerly created.

The bulge in the tire adjacent to where the tire tread contacts the road is where most of the flexing of the tire takes place and consequently the greatest amount of rubbing occurs at the juncture between the tire trim and the tire side wall at this point. By putting grooves in the tire trim at its outer edge, the outer edge is rendered more flexible to facilitate application of the tire trim to the wheel since the flex resistance of the tire trim is materially reduced.

It will be appreciated that the aforesaid dimensional relationships may be varied depending on the size of the wheel, the thickness of the trim ring, the type of material used in the manufacture of the trim ring, and the like.

It will be understood that modifications and variations may be effected without departing from the scope of the novel concepts of the present invention.

I claim as my invention:

1. A tire trim comprised of a synthetic material sized for extending across a terminal rim flange of a tire rim and adapted to be secured to a vehicle wheel, the tire trim including a radially inner margin sized for engagement against a metal wheel part and a radially outer margin sized for engagement against a tire side wall, the outer ring margin having sound damping means at its axially inner surface for disposition opposite a tire side wall for preventing a screeching noise that ordinarily occurs upon rotation of the tire trim when mounted on a vehicle wheel of the type described, said sound damping means comprising grooved areas disposed about the circumference of the axially inner surface of the radially outer ring margin, each of said grooved areas being at least approximately 1/64″ deep and being approximately 1/8″ wide and with the grooved areas being spaced approximately 1/16″ apart with centers of the grooved areas being approximately 3/16″ apart.

2. A tire trim comprised of a synthetic material sized for extending across a terminal rim flange of a tire rim and adapted to be secured to a vehicle wheel, the tire trim including a radially inner margin sized for engagement against a metal wheel part and a radially outer margin sized for engagement against a tire side wall, the outer ring margin having sound damping means at its axially inner surface for disposition opposite a tire side wall for preventing a screeching noise that ordinarily occurs upon rotation of the tire trim when mounted on a vehicle wheel of the type described, said sound damping means comprising grooved areas disposed about the circumference of the axially inner surface of the radially outer ring margin, each of said grooved areas being at least approximately 1/64″ deep and being approximately 1/8″ wide and with the grooved areas being spaced approximately 1/16″ apart with centers of the grooved areas being approximately 3/16″ apart, said grooved areas each being approximately 3/16″ in radial length.

3. In a wheel structure, a vehicle wheel including a tire rim having a terminal rim flange with a pneumatic tire thereon, a tire trim comprised of a synthetic material sized for extending across the terminal rim flange of the tire rim and adapted to be secured to a vehicle wheel, the tire trim including a radially inner margin having a radially outer margin sized for engagement against the tire side wall, the outer ring margin having sound damping means at its axially inner surface for disposition opposite a tire side wall for preventing a screeching noise that ordinarily occurs upon rotation of the vehicle wheel having a conventional type tire trim mounted thereon, and means for securing the tire trim on the wheel, said sound damping means comprising grooved areas disposed about the circumference of the axially inner surface of the radially outer ring margin, each of said grooved areas being at least approximately 1/64 inch deep and being approximately 1/8 inch wide and with the grooved areas being spaced approximately 1/16 inch apart said grooves having centers approximately 3/16 inch apart.

4. In a wheel structure, a vehicle wheel including a tire rim having a terminal rim flange with a pneumatic tire thereon, a tire trim comprised of a synthetic material sized for extending across the terminal rim flange of the tire rim and adapted to be secured to a vehicle wheel, the tire trim including a radially inner margin having a radially outer margin sized for engagement against the tire side wall, the outer ring margin having sound damping means at its axially inner surface for disposition opposite a tire side wall for preventing a screeching noise that ordinarily occurs upon rotation of the vehicle wheel having a conventional type tire trim mounted thereon, and means for securing the tire trim on the wheel, said sound damping means comprising grooved areas disposed about the circumference of the axially inner surface of the radially outer ring margin, each of said grooved areas being at least approximately 1/64 inch deep and being approximately 1/8 inch wide and with the grooved areas being spaced approximately 1/16 inch apart said grooves having centers approximately 3/16 inch apart, said grooved areas each being approximately 3/16 inch in radial length.

References Cited in the file of this patent

UNITED STATES PATENTS

| | | |
|---|---|---|
| 2,421,384 | Lyon | June 3, 1947 |
| 2,696,409 | Barnes | Dec. 7, 1954 |
| 2,819,119 | Perrin | Jan. 7, 1958 |
| 2,963,319 | Barnes | Dec. 6, 1960 |
| 3,000,672 | Aske | Sept. 19, 1961 |

FOREIGN PATENTS

| | | |
|---|---|---|
| 1,061,278 | France | Nov. 25, 1953 |
| 841,418 | Great Britain | July 13, 1960 |